C. ELTERICH & A. H. BRIGGS.
Drill-Chuck.
No. 207,113. Patented Aug. 20, 1878.
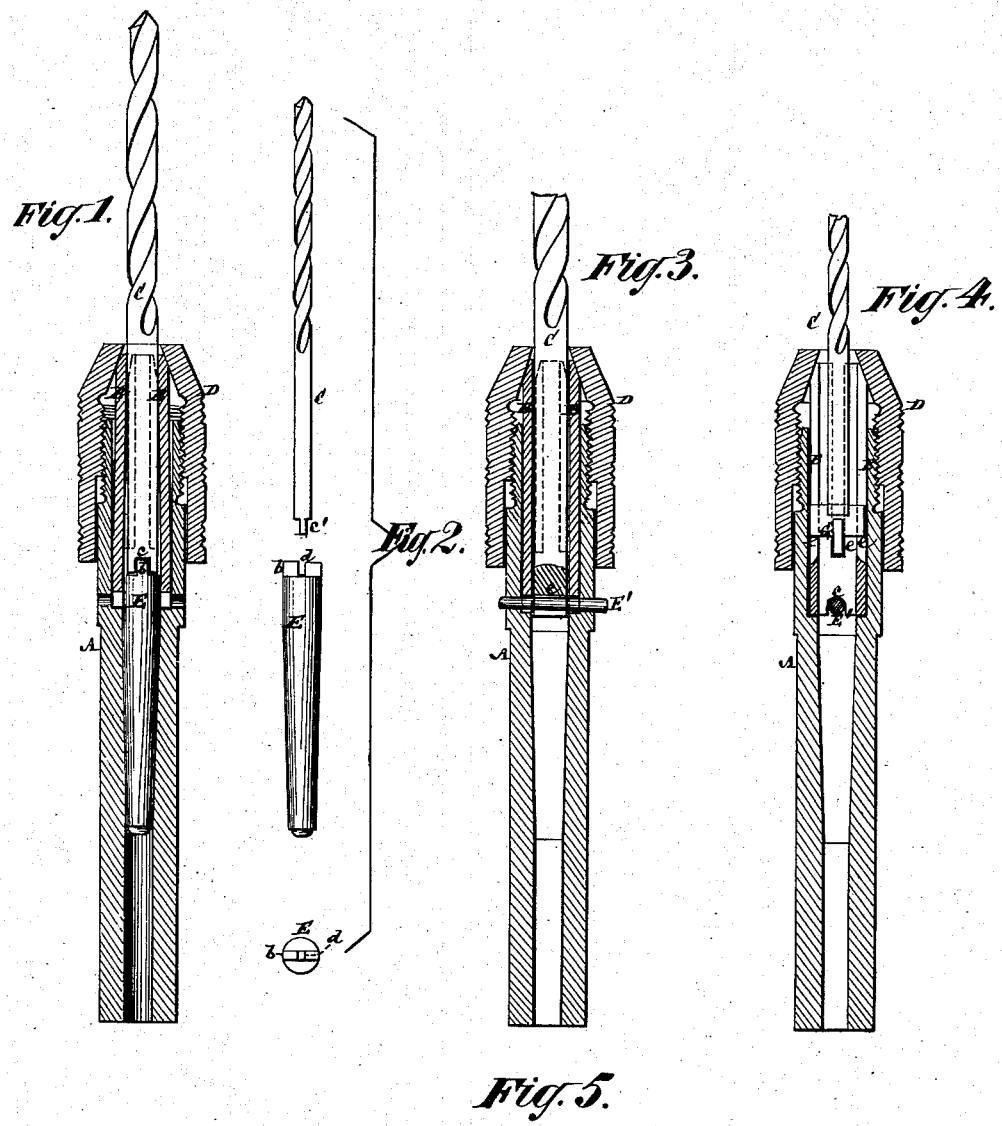

UNITED STATES PATENT OFFICE.

CHARLES ELTERICH, OF NEW YORK, N. Y., AND ANDREW H. BRIGGS, OF JERSEY CITY, NEW JERSEY.

IMPROVEMENT IN DRILL-CHUCKS.

Specification forming part of Letters Patent No. 207,113, dated August 20, 1878; application filed February 1, 1878.

*To all whom it may concern:*

Be it known that we, CHARLES ELTERICH, of the city, county, and State of New York, and ANDREW H. BRIGGS, of Jersey City, in the county of Hudson and State of New Jersey, have invented certain new and useful Improvements in Drill-Chucks, of which the following is a description, reference being had to the accompanying drawings, which form part of this specification.

This invention relates to drill-chucks in which the drill is not wholly dependent for its hold upon the expanding and contracting jaws that gripe and center the drill at a distance from its rear end, but in which such jaws have combined with them an independent positive driver of the drill, constructed to engage with the rear end of the drill. In this and in certain other respects this invention possesses several features in common with those shown in the drill-chucks for which Letters Patent Nos. 195,997 and 196,205, granted to us as assignees of Charles Elterich, on October 9, 1877, and October 16, 1877, respectively, and in which, among other peculiarities, a chuck having a slotted spring-jaw ferrule or tube has combined with it a detachable winged extension-piece, made capable of entry within said tube along the slotted portion of it, and constructed at either or both of its ends to engage with the back end of the drill, for the purpose of driving the latter and serving to advance the drill within the chuck to provide for wear or as other circumstances may require, said extension-piece preferably being reversible, and with its opposite ends constructed to fit different-sized drills. In such and other previous constructions of drill-chucks, however, the positive driver of the drill in the rear has been constructed with a recess to receive within it a flattened portion of the rear end of the drill, which construction, while answering for small drills, involves considerable labor to reduce the rear end of the drill when the latter is of large size. Nor, excluding a winged extension piece or driver, (the use of which is not always desirable,) have previous constructions provided for the removal of the positive driver from the mandrel which carries it to substitute a driver of different size; and in certain previous constructions it has been necessary, when using a drill-chuck composed of spring-jaws and clamping-nut combined, to remove the nut before the drill could be entered to its place within the chuck.

The object of our invention is to avoid, either in part or whole, these objections, and to provide additional conveniences; to which and other ends our invention consists in a combination, with expanding and contracting jaws for centering and griping the drill at a distance from its rear end, of a tongued or male drill-driver made detachable from the mandrel which carries it, and constructed to fit a notch or slot in the rear end of the drill. The invention also consists in a tongued drill-driver, constructed with a slot or recess in the front end of the tongue, whereby said driver may be used either for large drills, having recesses in the rear ends, or for smaller drills, formed with tongues on their rear ends. The invention likewise consists in a reversible-tongued drill-driver or extension-piece of novel and cheap construction.

Figure 1 is a longitudinal section, showing our invention, in part, as applied to a drill-chuck, in which a slotted spring-jaw ferrule or tube has combined with it a tightening and relaxing nut. Fig. 2 is a longitudinal view and an end view of a detachable male or tongued drill-driver, likewise a longitudinal view of a drill constructed to fit said driver. Fig. 3 is a longitudinal section of a similar chuck to that shown in Fig. 1, but showing a modified construction of the detachable male driver. Fig. 4 is another longitudinal section, showing the detachable winged extension-piece as applied to the chuck; and Fig. 5 a view, in perspective, of said extension-piece.

Referring, in the first instance, to Figs. 1 and 2, A is the mandrel, which might be a lathe-mandrel, but is here represented as the mandrel of the chuck. B B are the expanding and contracting jaws, for centering and holding the drill C at a distance from its rear end. These jaws, which form what may be termed a "jaw-clamp," might be variously constructed, but are here represented as formed by a slotted spring-jaw ferrule or tube, arranged to enter within a socket on the mandrel, and controlled, as regards its contraction and expansion, by an internally end-tapered nut, D, fitting a screw-thread on the mandrel.

E is a detachable drill-driver, of plug shape, made to fit longitudinally within the mandrel, and capable of ready removal therefrom when required to change it for another smaller or larger driver. This driver is constructed with a tongue, b, on its forward end, for the purpose of enabling it to engage with a slot, c, in the rear end of the drill. When a drill of small size, however, is used it will be more convenient to construct its rear end with a flattened portion or tongue, c', as shown in Fig. 2, and to convert the male drill-driver E, whether detachable or not, into a female driver by constructing its tongue b with a slot or recess, d, in its front end for the flattened portion c' of the drill C to engage with. Thus the same drill-driver E becomes a combined male and female one, and serves for both small and large sized drills—that is, drills having tongues on their rear ends and drills having slots or recesses therein.

Instead of constructing the positive male driver E of the drill of a plug form, running longitudinally in direction of the mandrel A, it may be in the shape of a removable pin, E', arranged to pass transversely through the mandrel, as shown in Fig. 3, and so that the slot c in the rear end of the drill will engage with said pin, which latter, being detachable, may be substituted by another one to fit a different-sized drill.

In Figs. 4 and 5, G is a detachable-tongued drill-driver or extension-piece, constructed of any number of leaves or wings, arranged to engage with the slots e of the spring ferrule or tube, having jaws B, and so that said ferrule, by a slotted construction of it with the cross-pin E', or with a tongue on the end of a longitudinal plug-shaped driver of similar construction to that shown in Fig. 1, will rotate the drill. Said drill-driver or extension-piece G, which is entered to its place within the ferrule on removing the nut D, although indirectly operated through the ferrule, takes the place of the tongue b of the drill-driver E in Fig. 1. It is preferred to make the tongued drill-driving extension-piece G reversible, and to this end to construct it of cross-plates, leaves, or wings S S', of different thicknesses, and arranged to interlock with one another for a portion of their depth, so that said plates form tongues of different thicknesses on opposite ends of said extension-driver to engage with different-sized drills, having slots or recesses in their back ends; and when it is required for a drill having a tongue on its rear end to engage with said extension-driver, either cross-wing of the latter is made with a recess or slot, d, in it for a tongue of the drill to enter, thus making said extension-piece both a male and female driver.

We claim—

1. The combination, with a mandrel and with a rotating jaw-clamp, of a detachable-tongued or male driver for the drill, substantially as specified.

2. A combined male and female driver of the drill, constructed with one or more tongues, having a slot or recess in their forward ends, for operation in relation with drills of male and female construction at their rear ends, essentially as described.

3. The reversible and detachable male driver or tongued extension-piece G, constructed of plates, wings, or leaves of different thicknesses, arranged to interlock with or cross one another for a portion of their depth on opposite ends of the driver, for use in connection with a drill and with a slotted drill-chuck, substantially as specified.

CHARLES ELTERICH.
ANDREW H. BRIGGS.

Witnesses:
BENJAMIN W. HOFFMAN,
VERNON H. HARRIS.